(12) United States Patent
Knudson et al.

(10) Patent No.: US 10,741,174 B2
(45) Date of Patent: Aug. 11, 2020

(54) AUTOMATIC LANGUAGE IDENTIFICATION FOR SPEECH

(71) Applicant: Lenovo (Singapore) Pte. Ltd., Singapore (SG)

(72) Inventors: Ryan Charles Knudson, Durham, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/414,226

(22) Filed: Jan. 24, 2017

(65) Prior Publication Data

US 2018/0211650 A1 Jul. 26, 2018

(51) Int. Cl.
*G10L 15/183* (2013.01)
*G10L 15/22* (2006.01)

(52) U.S. Cl.
CPC ...... *G10L 15/183* (2013.01); *G10L 2015/226* (2013.01)

(58) Field of Classification Search
CPC .............. G10L 13/00; G10L 13/086
USPC ....................... 704/235
See application file for complete search history.

(56) References Cited

U.S. PATENT DOCUMENTS

| | | | | |
|---|---|---|---|---|
| 6,717,588 B1* | 4/2004 | Miller | ............... | G06F 9/454 715/700 |
| 8,447,608 B1* | 5/2013 | Chang | ............... | G10L 15/197 704/257 |
| 2005/0033582 A1* | 2/2005 | Gadd | ............... | G06Q 30/02 704/277 |
| 2008/0040099 A1* | 2/2008 | Wu | ............... | G06F 17/275 704/9 |
| 2008/0162146 A1* | 7/2008 | Eckert | ............... | G10L 15/005 704/275 |
| 2008/0221898 A1* | 9/2008 | Cerra | ............... | G10L 15/30 704/270.1 |
| 2009/0271176 A1* | 10/2009 | Bodin | ............... | G06F 17/289 704/2 |
| 2010/0185448 A1* | 7/2010 | Meisel | ............... | G10L 15/22 704/256.1 |
| 2011/0055256 A1* | 3/2011 | Phillips | ............... | G10L 15/30 707/769 |
| 2011/0093265 A1* | 4/2011 | Stent | ............... | G10L 15/06 704/243 |
| 2011/0153324 A1* | 6/2011 | Ballinger | ............... | G10L 15/30 704/235 |
| 2011/0307241 A1* | 12/2011 | Waibel | ............... | G10L 15/265 704/2 |
| 2012/0035907 A1* | 2/2012 | Lebeau | ............... | G06F 17/28 704/2 |
| 2013/0144597 A1* | 6/2013 | Waibel | ............... | G06F 17/28 704/2 |

(Continued)

*Primary Examiner* — Daniel C Washburn
*Assistant Examiner* — Timothy Nguyen
(74) *Attorney, Agent, or Firm* — Ference & Associates LLC

(57) ABSTRACT

One embodiment provides a method, including: receiving, at an information handling device, voice input from at least one user; accessing at least one language model; determining, based upon the accessed at least one language model, at least one language of the voice input; and providing output associated with the voice input, based upon the determined language. Other aspects are described and claimed.

20 Claims, 3 Drawing Sheets

(56) References Cited

U.S. PATENT DOCUMENTS

| | | | |
|---|---|---|---|
| 2013/0346077 A1* | 12/2013 | Mengibar | G10L 15/265 704/235 |
| 2014/0012586 A1* | 1/2014 | Rubin | G10L 25/51 704/273 |
| 2015/0051898 A1* | 2/2015 | Cuthbert | G06F 3/167 704/3 |
| 2015/0161997 A1* | 6/2015 | Wetsel | G06F 3/167 704/275 |
| 2015/0364129 A1* | 12/2015 | Gonzalez-Dominguez | G10L 15/005 704/251 |
| 2016/0125877 A1* | 5/2016 | Foerster | G10L 15/20 704/232 |

* cited by examiner

US 10,741,174 B2

AUTOMATIC LANGUAGE IDENTIFICATION FOR SPEECH

BACKGROUND

Information handling devices ("devices"), for example smart phones, tablet devices, laptop computers, and the like, are capable of receiving and analyzing voice input data from a variety of different languages. For example, a device can receive voice input data when a user is providing dictation to the device, providing commands to the device or an application on the device, and the like. Advances in technology have led to the development of automatic speech recognition (ASR) technology. This technology allows a device to receive voice input in a particular language and generate output (e.g., textual output, vocal output, etc.) associated with the language.

BRIEF SUMMARY

In summary, one aspect provides a method, comprising: receiving, at an information handling device, voice input from at least one user; accessing at least one language model; determining, based upon the accessed at least one language model, at least one language of the voice input; and providing output associated with the voice input, based upon the determined language.

Another aspect provides an information handling device, comprising: a processor; a memory device that stores instructions executable by the processor to: receive voice input from at least one user; access at least one language model; determine, based upon the accessed at least one language model, at least one language of the voice input; and provide output associated with the voice input, based upon the determined language.

A further aspect provides a product, comprising: a storage device that stores code, the code being executable by a processor and comprising: code that receives voice input from at least one user; code that accesses at least one language model; code that determines, based upon the accessed at least one language model, at least one language of the voice input; and code that provides output associated with the voice input, based upon the determined language.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
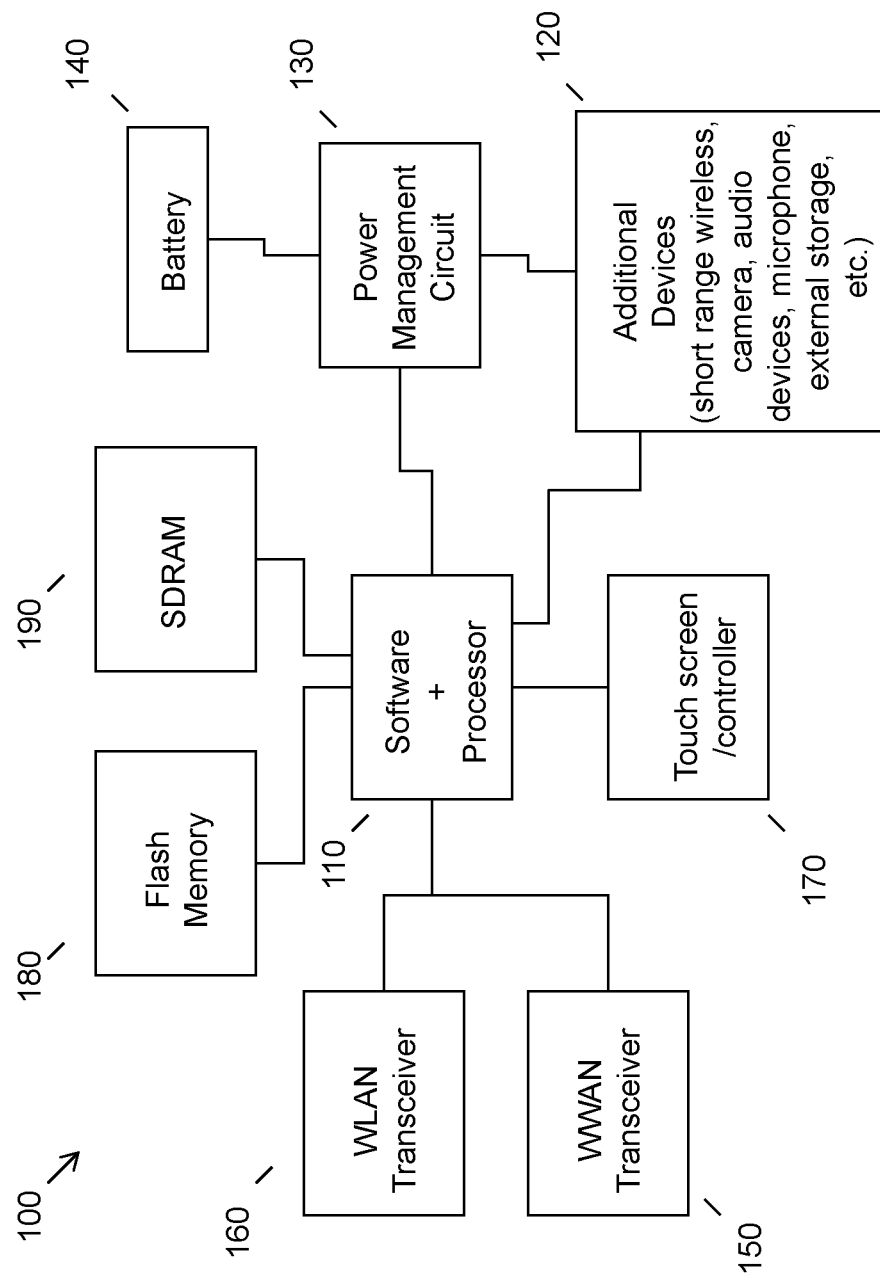
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Automatic speech recognition (ASR) systems are capable of converting speech signals into readable text. These systems are often employed by devices to transcribe user-provided vocal input (e.g., dictation input, command input, etc.) into textual output in real time. For example, a user may vocally recite items on a shopping list (e.g., milk, bread, etc.) to an input device (e.g., microphone, another speech capture device, etc.) of an ASR-enabled device. Responsive to identifying the spoken words, the device may generate (e.g., in a note-taking application, text-messaging application, email application, etc.) a textual transcription of the spoken words. ASR systems are capable of recognizing voice input in various languages (e.g., English, Spanish, Chinese, etc.) and may generate the textual transcription in a script that corresponds to the input language (e.g., Latin alphabet for English, logograms for Chinese and Japanese, etc.).

Conventionally, ASR systems comprise language models that may be specific to a particular language. For example, for an ASR-enabled device capable of performing speech-to-text (STT) functions for English, Spanish, and French, the system may comprise three language models that correspond to each of those languages. The language models may come preloaded with the system or may be trained with voice input. For example, an ASR-enabled device must first receive (e.g., during a dedicated training session, as a speech sample from a speaker, etc.) voice data corresponding to a specific, previously-identified, language. The voice data may then be analyzed (e.g., to determine individual word characteristics, to determine voice characteristics, etc.) and stored (e.g., in a database, a data storage location, etc.) in the corresponding language model. Subsequent to creation of the language model and prior to providing additional voice input for analysis by the ASR program, conventional methods require a user to preselect a language setting. For example, users desiring to perform STT functions in Spanish must first go to the settings on the device and activate the Spanish ASR. This selection activates the corresponding Spanish language model that is able to recognize and transcribe subsequently provided Spanish language voice input.

However, these conventional methods provide issues related to constant adjustment of the language setting. The requirement to pre-select a language setting each time a user desires to provide input in a different language may become time-consuming and burdensome in certain situations. For example, for multi-lingual users who have a need to provide voice input to a device in different languages, the requirement to constantly change language settings may be frustrating. As another example, when voice input is provided to a device from multiple users in a bilingual or multi-lingual setting (e.g. in an international corporate meeting setting, in a courtroom setting, etc.), the device may not be able to accurately transcribe the voice input that is being provided in these different languages without constant manual readjustment of the language setting.

Accordingly, an embodiment provides a method for automatically determining the language associated with user-provided voice input. In an embodiment, voice input data associated with at least one language may be provided by a user to a device (e.g., smart phone, tablet, laptop computer, personal computer, etc.). Subsequent to receiving the voice input, an embodiment may identify the at least one language by comparing the received voice input to at least one language model stored (e.g., at an accessible storage location) in the ASR-system. Subsequent to determining the language of the voice input, an embodiment may access the language model associated with the determined input language. An embodiment may then generate output (e.g., textual output, vocal output, etc.) associated with the input language. Such a method may eliminate the need for users to manually adjust the language setting on their device each time they desire to provide voice input in a different language.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera. System 100 often includes a touch screen 170 for data input and display/rendering. System 100 also typically includes various memory devices, for example flash memory 180 and SDRAM 190.

Figure 2:
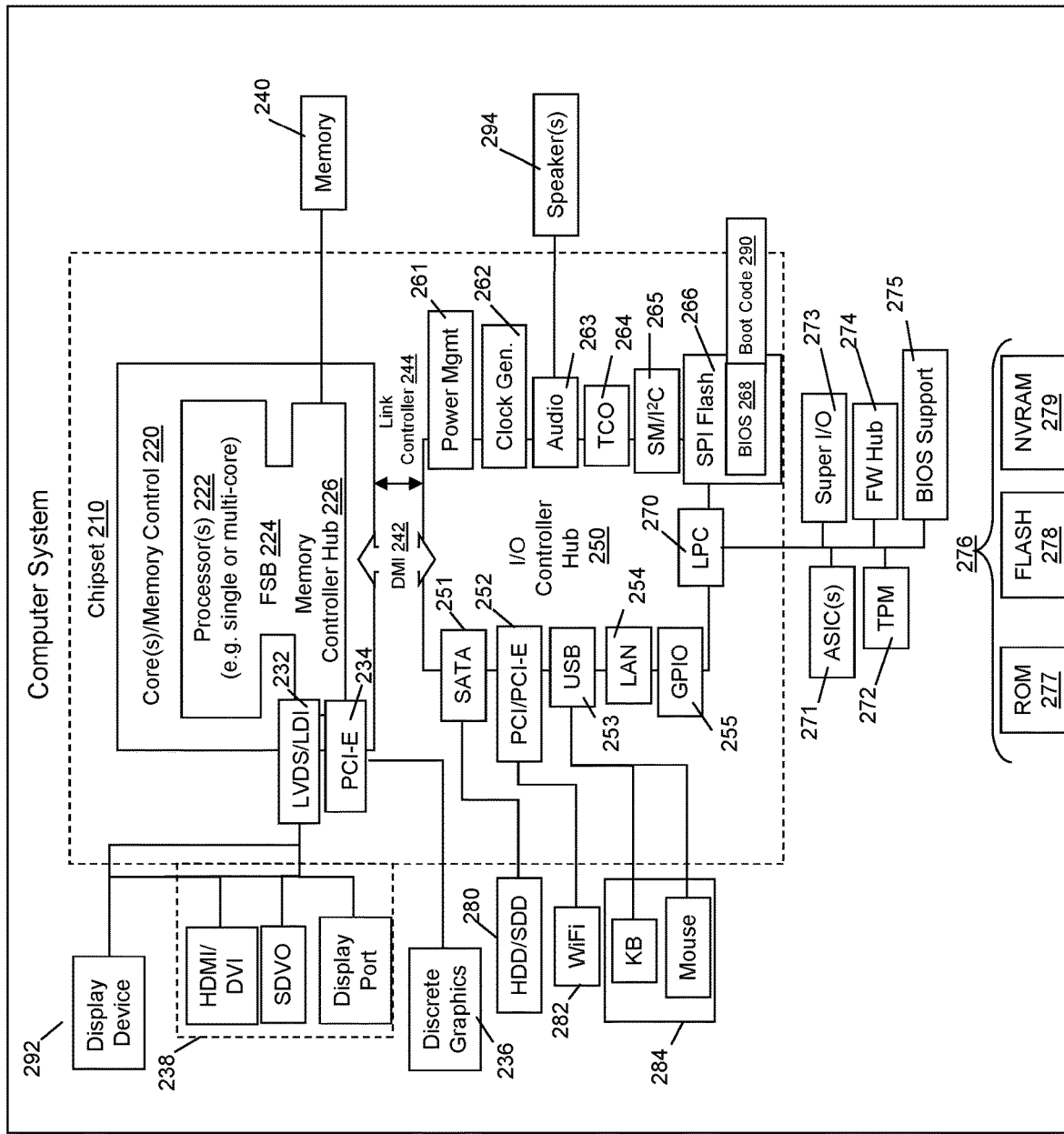
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices may be used for speech recognition, for example, for supporting an ASR system. For example, the circuitry outlined in FIG. 1 may be implemented in a tablet or smart phone embodiment, whereas the circuitry outlined in FIG. 2 may be implemented in a personal computer embodiment.

Figure 3:
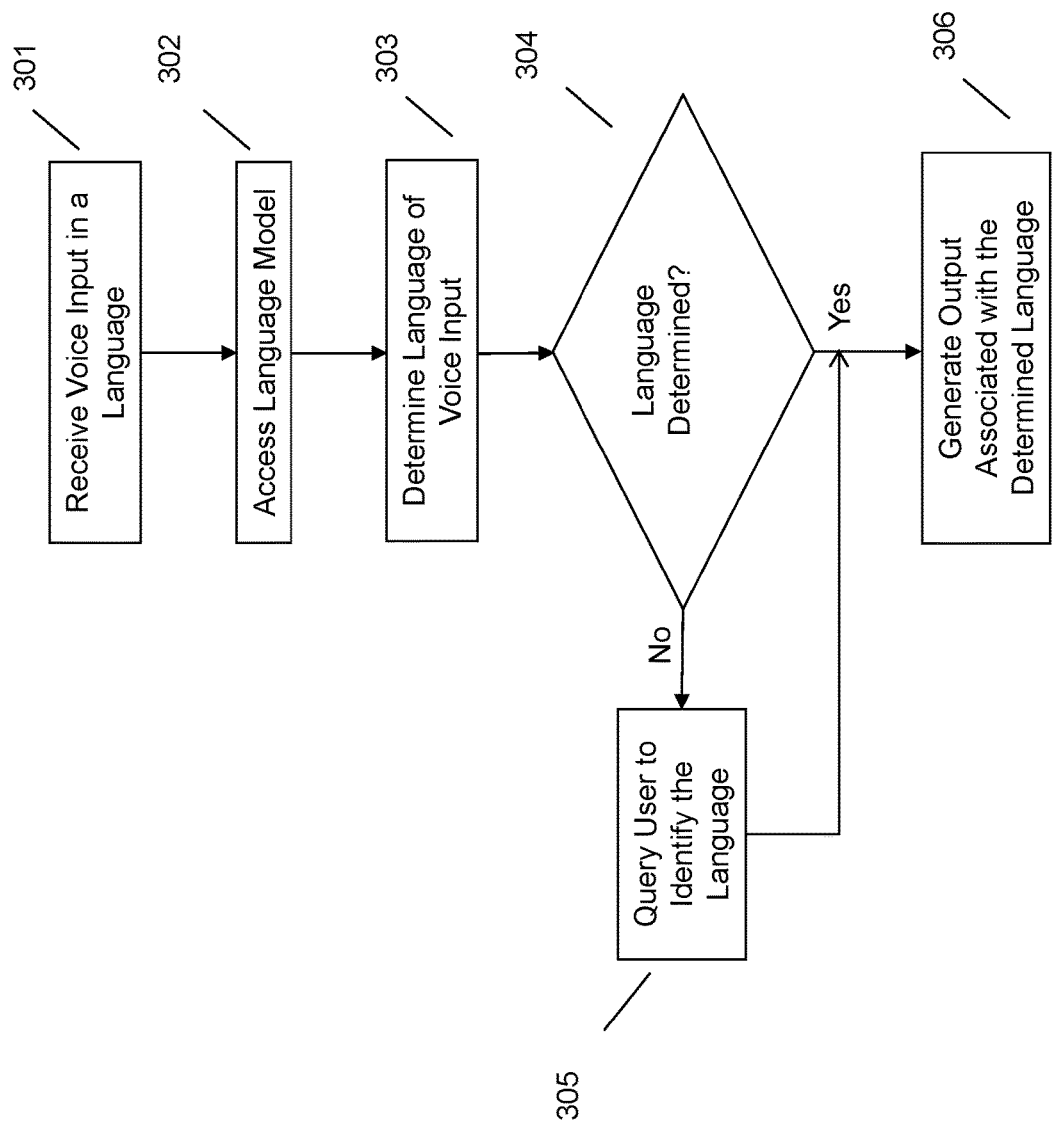
FIG. 3 illustrates an example method of determining an input language and generating output associated with that language.

Referring now to FIG. 3, an embodiment may determine a language associated with user-provided voice input and generate output associated with the determined language. At 301, an embodiment may receive voice input in at least one language from a user, or a group of users, at an input device (e.g., a microphone, speech capture device, etc.) operatively coupled to an ASR-enabled device. In an embodiment, voice input may be received from one user at a time or may be received from multiple users simultaneously. For example, in the context of an international company meeting, multiple participants may be conversing in multiple languages at once. This multilingual voice input may be received by a device or an application on a device (e.g., a digital assistant that records and transcribes conversations, etc.). In one embodiment, the system may be set to a default language. However, the language associated with the voice input does not have to correspond to the default language. In other words, the system does not have to be set to receive the language associated with the voice input.

In one embodiment, the ASR system may be integral to the device. Alternatively, the ASR system may be connected via a wireless or wired connection to the device. For example, the speech may be captured using a microphone integral to a user device and then transmitted to another device containing the ASR system using a wired or wireless connection. The ASR device may include one or more devices. In other words, the device may include software which provides for processing and analysis of the voice input. Alternatively, the device that captures or receives the voice data may transmit the voice data to another device for processing and analysis.

At 302, an embodiment may access at least one language model and determine, at 303, the language associated with the voice input. In an embodiment, the language model may be capable of receiving and processing acoustic signals present in voice input associated with a particular language. The language models may use a variety of techniques to decode the input including using Hidden Markov Models, Viterbi Algorithms, and other decoding processes well known in the art. In an embodiment, the language models can be stored locally (e.g., on the device), remotely (e.g., the cloud, network storage location, etc.), or a combination thereof.

In an embodiment, the input language may be determined by comparing the received voice input against one or more stored language models. For example, a user may vocally provide voice input to an ASR-enabled device comprising three language models (e.g., English, Spanish, and French). The system may then compare the voice input to each of the language models to determine the language associated with the voice input. In one embodiment, determining the language may include using confidence scoring to predict the most likely language of the input. In the aforementioned example, if the voice input was provided in English, an embodiment may assign the English language model the highest confidence score based on an analysis of the acoustic signals of the input. Subsequent to determining the language of the input, an embodiment may utilize the language model to perform downstream functions (e.g., provide textual output, provide vocal output, etc.).

In an embodiment, the input language may be determined by identifying the language associated with a wakeup indication present in the voice input. The wakeup indication may be a wakeup word, a wakeup phrase, or a combination thereof, that signals to the system that the user desires to provide input. For example, the digital assistant, "Lenovo," may be woken up with the English-language wakeup word "Hi, Lenovo." Responsive to receiving the wakeup indication, an ASR-system may be ready to receive and process speech input. In an embodiment, an ASR-system may be trained on the same wakeup indication in multiple languages. For example, a speaker may train the system by providing the wakeup indication in each of the languages and that wakeup indication is then assigned to the respective language. When the wakeup indication is received, the wakeup indication can be compared against each of the trained wakeup indications to identify the appropriate language model. For example, the English-language wakeup word "Hi, Lenovo" may activate the English language ASR; the Spanish-language wakeup word "Hola, Lenovo" may activate the Spanish language ASR, etc.

In an embodiment, the input language may be determined by utilizing global positioning system (GPS) data associated with a user's device. A GPS-enabled device may be able to determine a user's geographic location and then activate the language model associated with that location. For example, if a user was traveling in Spain, an embodiment may determine that a user was positioned in Spain and subsequently access the Spanish language model.

At 306, an embodiment may generate output associated with the input language by utilizing the corresponding language model. In an embodiment, the output may be textual output that may be a textual transcription of the voice input. The transcription may be generated (e.g., by using the data stored in the corresponding language model) in the character script of the input language. For example, a user may vocally provide Chinese-language input to a device and an embodiment may transcribe that input into Chinese characters. Alternatively, in an embodiment, multiple language models may be trained to generate output in a single script. For example, an ASR-enabled device may comprise three language models (e.g., English, Japanese, and Chinese). If a user vocally provided (e.g., in Chinese) the input "Remember to get paper towels" to a note-taking application, an embodiment may transcribe the vocal Chinese input in English character script.

Other outputs may be generated in response to the user-provided voice input. For instance, in response to a user-provided vocal search query (e.g., provided to a search field of a search engine, etc.), an embodiment may textually output the results of the query in the input language. For example, if a user vocally provided the Spanish-language search query "Who are the actors in the TV show, THE WEST WING®," an embodiment may display a clickable list of search results, displayed in Spanish wording, related to the query. In another embodiment, the device may generate audible output in the language of the input language. For example, if a user vocally provided the Spanish-language search query "Who are the actors in the TV show, THE WEST WING®," an embodiment may output (e.g., through a speaker, another output device, etc.) an audible list of actors in THE WEST WING® in Spanish.

At 305, responsive to not determining the language that the voice input was provided in at 304, an embodiment may query the user to identify the language of the voice input. For example, an ASR-enabled device may be set with a default language model (e.g., an English language model). If the device determines (e.g., by comparing the voice input to the English language model) that the received input is non-English language voice input, an embodiment may query (e.g., using a notification box, providing a prompt to the user, utilizing another visual or audio representation, etc.) the user to identify the language of the input. Thereafter, an embodiment may refer to the corresponding language model to perform downstream functions (e.g., generate a textual transcription of the vocal input, generate other output, etc.).

The various embodiments described herein thus represent a technical improvement to conventional speech recognition techniques. Using the techniques described herein, an embodiment may automatically and dynamically determine a voice input language and subsequently generate output associated with that language. Such techniques eliminate the need for users to manually designate a language setting prior to providing voice input.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    determining, using GPS data and without receiving user input selecting a language model, a geographic location of an information handling device;
    accessing, based upon the user's geographic location, at least one language model corresponding to a predominant language associated with the geographic location of the information handling device;
    receiving, at the information handling device, a user voice input containing a multitude of voice inputs in different languages, wherein each of the multitude of voice inputs is provided to the information handling device in a unique language and wherein the unique language is different from the predominant language;
    identifying, by accessing a database of stored language models, the unique language associated with a wakeup word in each of the multitude of voice inputs; and
    providing, subsequent to the identifying, an output response to each of the multitude of voice inputs in the predominant language.

2. The method of claim 1, wherein the determining comprises comparing the voice input to the at least one language model.

3. The method of claim 2, further comprising generating a confidence score related to a match between the voice input and the at least one language model.

4. The method of claim 2, wherein each of the at least one language models are associated with a different language.

5. The method of claim 1, wherein the accessing comprises accessing a default language model.

6. The method of claim 5, responsive to determining the voice input is not associated with the default language model, further comprising prompting the at least one user to identify the at least one language associated with the voice input.

7. The method of claim 1, wherein the voice input comprises a wakeup indication.

8. The method of claim 7, wherein the accessing comprises accessing at least one language model associated with the wakeup indication.

9. The method of claim 1, wherein the output comprises a textual transcription of the voice input in a script associated with the determined at least one language.

10. The method of claim 1, wherein the output comprises a vocal recitation of generated results responsive to the voice input.

11. An information handling device, comprising:
a processor;
a memory device that stores instructions executable by the processor to:
determine, using GPS data and without receiving user input selecting a language model, a geographic location of the information handling device;
access, based upon the user's geographic location, at least one language model corresponding to a predominant language associated with the geographic location of the information handling device;
receive a user voice input containing a multitude of voice inputs in different languages, wherein each of the multitude of voice inputs is provided to the information handling device in a unique language and wherein the unique language is different from the predominant language;
identify, by accessing a database of stored language models, the unique language associated with a wakeup word in each of the multitude of voice inputs; and
provide, subsequent to the identifying, an output response to each of the multitude of voice inputs in the predominant language.

12. The information handling device of claim 11, wherein the instructions executable by the processor to determine comprises instructions executable by the processor to compare the voice input to the at least one language model.

13. The information handling device of claim 12, wherein instructions executable by the processor further comprise instructions to generate a confidence score related to a match between the voice input and the at least one language model.

14. The information handling device of claim 12, wherein each of the at least one language models are associated with a different language.

15. The information handling device of claim 11, wherein the instructions executable by the processor to access comprises instructions executable by the processor to access a default language model.

16. The information handling device of claim 11, wherein the voice input comprises a wakeup indication.

17. The information handling device of claim 16, wherein the instructions executable by the processor to access comprises accessing at least one language model associated with the wakeup indication.

18. The information handling device of claim 11, wherein the output comprises a textual transcription of the voice input in a script associated with the determined at least one language.

19. The information handling device of claim 11, wherein the output comprises a vocal recitation of generated results responsive to the voice input.

20. A product, comprising:
a storage device that stores code, the code being executable by a processor and comprising:
code that determines, using GPS data and without receiving user input selecting a language model, a geographic location of an information handling device;
code that access, based upon the user's geographic location, at least one language model corresponding to a predominant language associated with the geographic location of the information handling device;
code that receives a user voice input containing a multitude of voice inputs in different languages, wherein each of the multitude of voice inputs is provided to the information handling device in a unique language and wherein the unique language is different from the predominant language;
code that identifies, by accessing a database of stored language models, the unique language associated with a wakeup word in each of the multitude of voice inputs; and
code that provides, subsequent to the identifying, an output response to each of the multitude of voice inputs in the predominant language.

* * * * *